(12) United States Patent
Feng

(10) Patent No.: US 9,983,635 B2
(45) Date of Patent: May 29, 2018

(54) CONTROL BUTTONS FOR NOTEBOOKS AND CONVERTIBLE DEVICES

(71) Applicant: Cheng Feng, Shanghai (CN)

(72) Inventor: Cheng Feng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/128,973

(22) PCT Filed: Sep. 27, 2013

(86) PCT No.: PCT/CN2013/084395
§ 371 (c)(1),
(2) Date: Dec. 23, 2013

(87) PCT Pub. No.: WO2015/042847
PCT Pub. Date: Apr. 2, 2015

(65) Prior Publication Data
US 2015/0092323 A1    Apr. 2, 2015

(51) Int. Cl.
G06F 1/16       (2006.01)
G06F 3/02       (2006.01)
G06F 3/0354     (2013.01)

(52) U.S. Cl.
CPC ............ *G06F 1/1671* (2013.01); *G06F 1/169* (2013.01); *G06F 1/1632* (2013.01); *G06F 3/0202* (2013.01); *G06F 3/03547* (2013.01)

(58) Field of Classification Search
CPC .... G06F 1/1671; G06F 3/03547; G06F 1/169; G06F 3/0202; G06F 1/1632

(Continued)

(56) References Cited

U.S. PATENT DOCUMENTS 7,242,385 B2 *  7/2007  Kojo ................ G06F 1/162
                                                345/156
7,424,623 B2 *  9/2008  Du .................. G06F 9/441
                                                713/1

(Continued)

FOREIGN PATENT DOCUMENTS

CN      2842556 Y     11/2006
CN    101320282 A     12/2008

(Continued)

OTHER PUBLICATIONS

International Search Report and Written Opinion received for PCT Patent Application No. PCT/CN2013/084395, dated Jul. 1, 2014, 16 Pages.

*Primary Examiner* — Tuan T Dinh
*Assistant Examiner* — Rockshana Chowdhury
(74) *Attorney, Agent, or Firm* — Spectrum IP Law Group LLC

(57) ABSTRACT

A keyboard or keyboard unit comprises an upper surface and a lower surface, and a front edge. An array of keys is disposed on the upper surface. One or more control buttons are disposed on the front edge, wherein the control buttons are configurable to provide a first functionality such as mouse button functionality. A user is able to depress the one or more control buttons by moving a thumb in a direction generally perpendicular to the front edge. The keyboard is able to couple with a display unit to provide a tablet form factor wherein the one or more control buttons are accessible in the tablet form factor. The control buttons are configurable to provide a first functionality such as a mouse button for a notebook form factor, and to provide a second functionality such as controls suitable for a tablet for a tablet form factor.

15 Claims, 9 Drawing Sheets

(58) Field of Classification Search
USPC .................................................. 361/679.9
See application file for complete search history.

(56) References Cited

U.S. PATENT DOCUMENTS

| | | | | |
|---|---|---|---|---|
| 8,050,018 B2* | 11/2011 | Takizawa | ................. | 361/679.06 |
| 2005/0063149 A1* | 3/2005 | Shimamoto | ............ | G06F 1/162 |
| | | | | 361/679.06 |
| 2006/0279550 A1* | 12/2006 | Lii | ........................ | G06F 1/1616 |
| | | | | 345/173 |
| 2008/0174951 A1* | 7/2008 | Mundt | ................. | G06F 1/1616 |
| | | | | 361/679.41 |
| 2008/0252610 A1* | 10/2008 | Tracy | ................... | G06F 1/1616 |
| | | | | 345/173 |
| 2009/0244009 A1* | 10/2009 | Staats | .................... | G06F 1/162 |
| | | | | 345/168 |
| 2009/0303676 A1* | 12/2009 | Behar | .................... | G06F 1/162 |
| | | | | 361/679.27 |
| 2012/0050581 A1* | 3/2012 | Knee | ........................ | 348/240.99 |

FOREIGN PATENT DOCUMENTS

| | | |
|---|---|---|
| CN | 202058072 U | 11/2011 |
| CN | 203038154 U | 7/2013 |

* cited by examiner

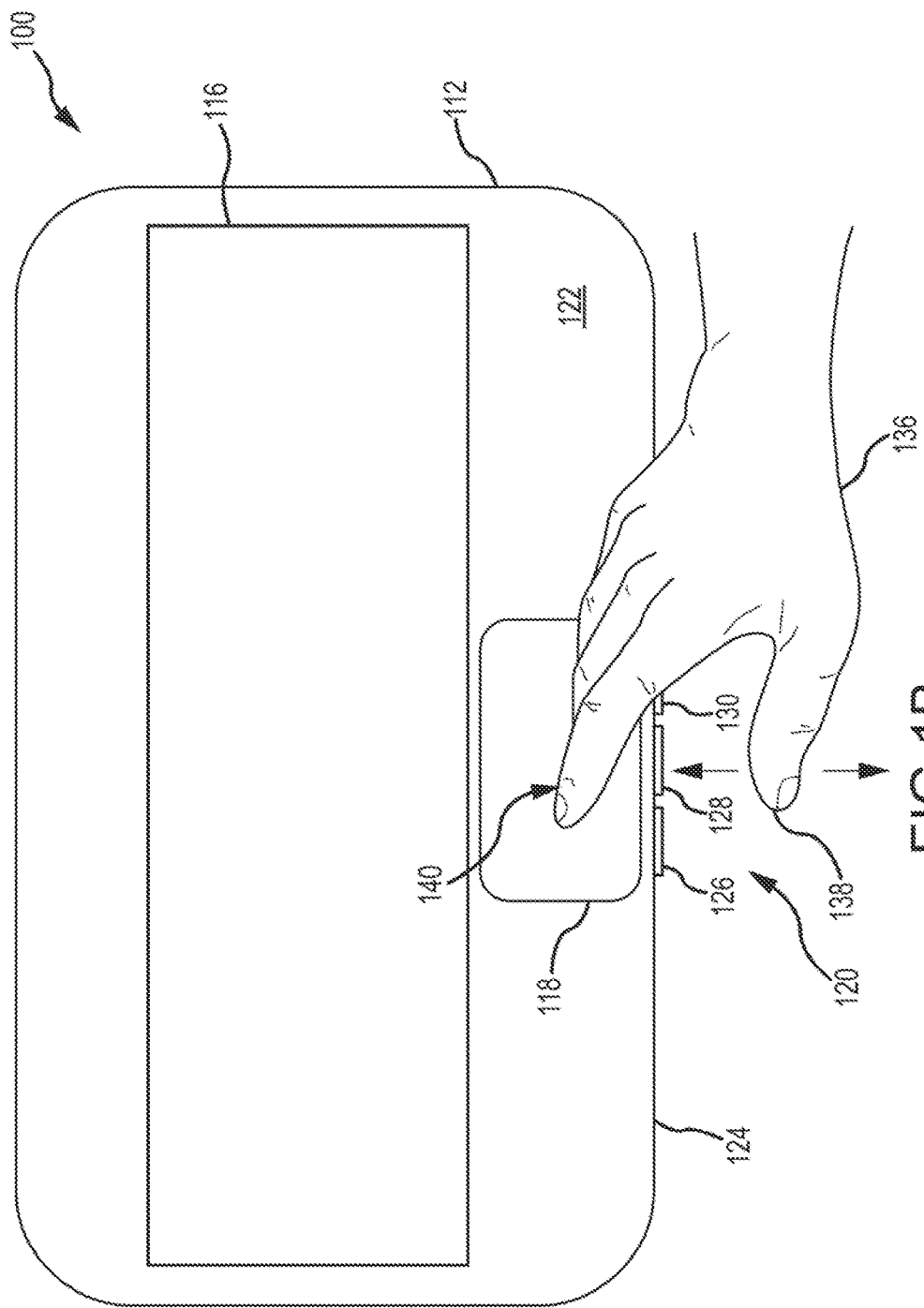

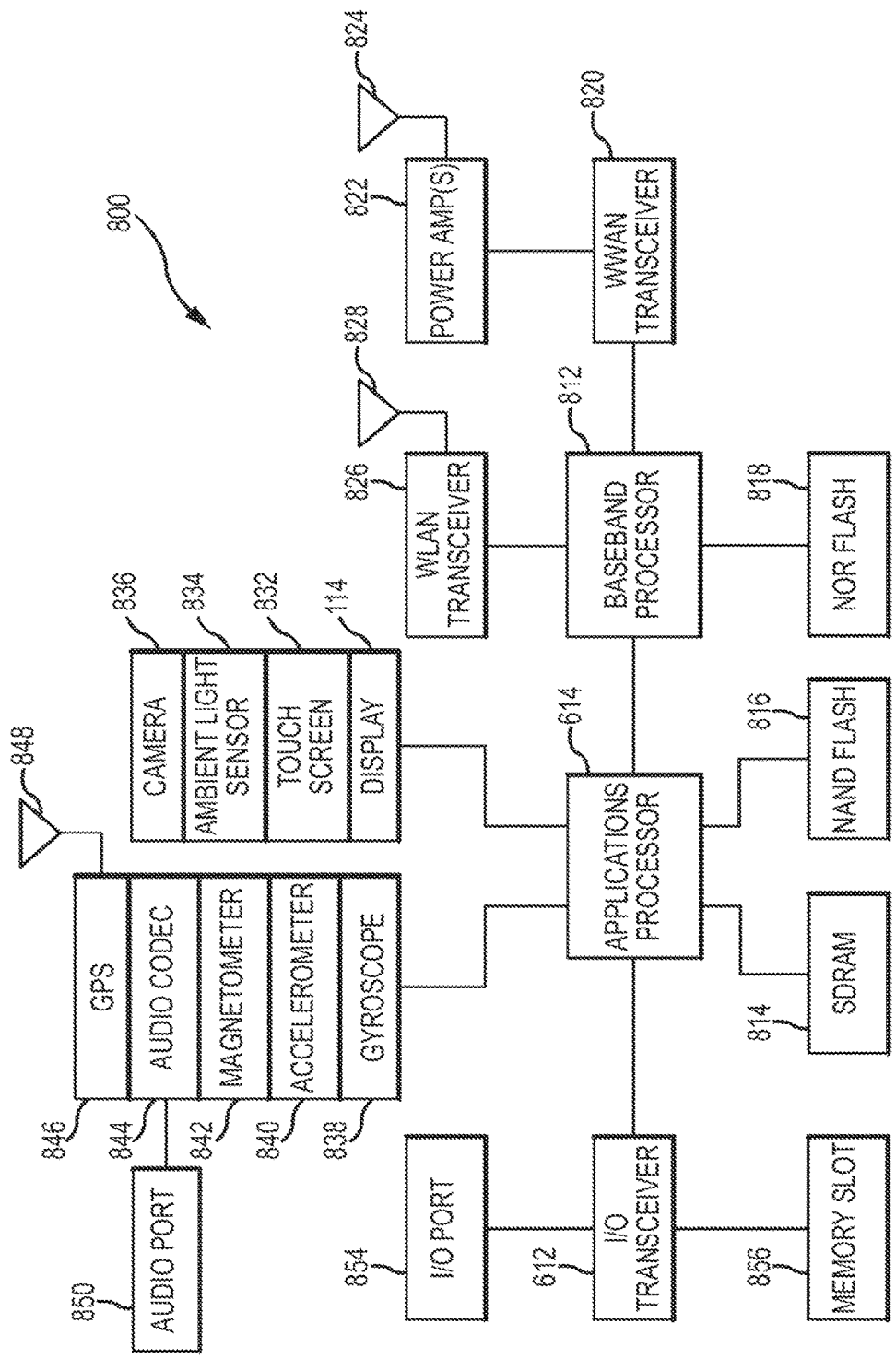

CONTROL BUTTONS FOR NOTEBOOKS AND CONVERTIBLE DEVICES

BACKGROUND

Notebook computers traditionally comprise a clamshell design having a track pad located on the same surface as the keyboard. The clamshell design generally has two sections, the display unit and the keyboard unit, and four surfaces, the "A" surface opposite to the display, the "B" surface on which the display is visible, the "C" surface on which the keyboard and track pad are typically located, and the "ID" surface on which the device rests. The track pad is typically located on the "C" surface of the clamshell to provide mouse pointer control of the graphical user interface running on the notebook. In order to provide left and right, mouse button inputs and context menu control, the track pad itself may include mouse control buttons under selected areas of the track pad, or the mouse control buttons may be located adjacent to the track pad on the same surface.

Advents in touch input operating systems have resulted in touch screen devices or digitizer layers integrated with the notebook displays to allow the user to operate the device using touch commands. In order to allow users to operate the device in a tablet mode, notebook computers are being designed to operate in a tablet mode by allowing movement of the display unit of the clamshell to meet with the keyboard unit of the clamshell so that the display surface, the "B" surface, is visible and allows the user to easily touch the display to provide touch input control of the device. Such notebooks are referred to as convertible devices since they allow a notebook style clamshell computer to be easily converted into a tablet for tablet mode operation. However, in a tablet mode, the mouse control buttons are covered by the display unit and are not accessible, or they are located on the bottom of the tablet form factor and are consequently disabled. Thus, mouse control buttons currently are unusable in a convertible notebook that is operating in a tablet mode.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 1B is a top view diagram of the notebook of FIG. 1A showing the operation of the control buttons with a user's thumb in accordance with one or more embodiments;

FIG. 8 is a block diagram of an information handling system of a notebook or convertible device in accordance with one or more embodiments.

Figure 1A:
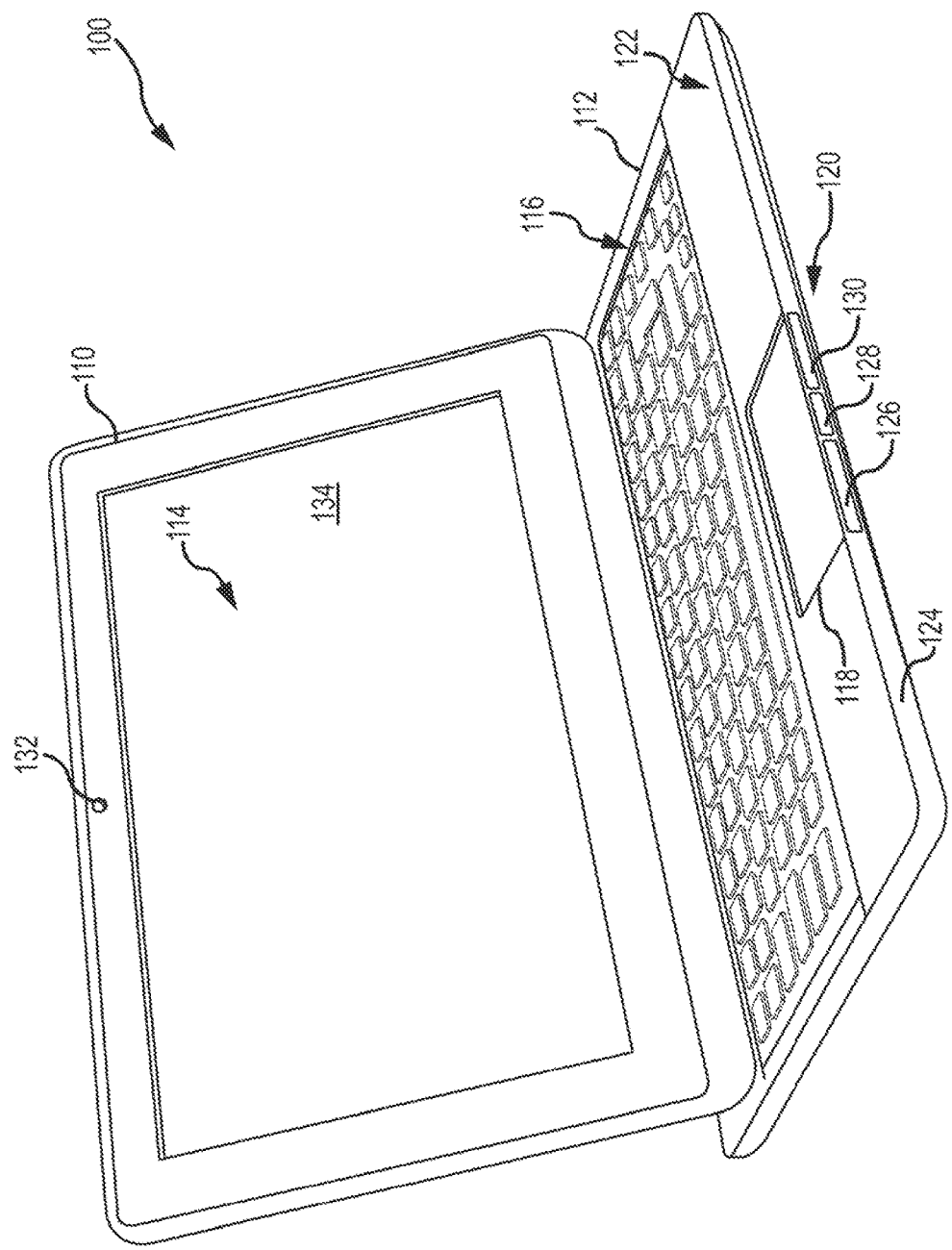
FIG. 1A is an isometric diagram of a notebook having control buttons in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1A, a diagram of a notebook having control buttons in accordance with one or more embodiments in accordance with one or more embodiments will be discussed. As shown in FIG. 1A, a notebook 100 may comprise a display unit 110 and a keyboard unit 112. Display unit 110 may include a display 114 which optionally may include a touchscreen 134 comprising a touch screen or digitizer as an additional layer or integrated with the display 114. Display unit 110 optionally may further include a camera 132 and other various input device such as one or more microphones, ambient light sensors, and so on (not shown). Keyboard unit 112 may include a keyboard 116 or similar input device and/or a track pad 118 on a top surface 122 of keyboard unit 122 to provide mouse control type inputs to the notebook. Optionally, other input type devices such as a track stick or track ball (not shown) may be included on keyboard unit 112. In one or more embodiments, a control button system 120 may comprise one or more control buttons such as control button 126, control button 128 and/or control button 130 that may provide mouse control or input functions to notebook 100. For example, the control buttons of control button system 120 may provide right mouse click left mouse click, context menu, scrolling, volume control, zoom control, and/or any other various functions for a user to control notebook 100. In one or more particular embodiments, control button system 120 may be disposed on an edge 124 of keyboard unit 112, for example so that the user may actuate the one or more control buttons by moving the user's thumb, for example using a squeezing motion in a non-limiting example. Furthermore, control button system 120 may be generally centrally located, along, edge 124 so that the control buttons may be easily operated by either a user's right hand or left hand. In general, control button system 120 may be operated by a user in conjunction with track pad 118 to provide full mouse control of notebook 100 when operating notebook in a typical notebook or laptop operation, in one or more embodiments, display unit 110 is coupled with keyboard unit 112 in a manner such that display unit 110 is intended to remain coupled with keyboard unit 112 during operation or otherwise in a tablet form factor. In other embodiments, keyboard unit 112 is able to be detached from the display unit 110 by the user, for example to allow independent operation of just the display unit 110 or just the keyboard unit 112. In some embodiments, keyboard unit 112 may not physically couple with display unit 110 but may operationally couple with display unit 110, for example via a wireless connections such as in accordance with a Bluetooth™ standard, Zigbee™ standard, or a similar wireless connection. In yet other embodiments, keyboard unit 112 may be a stand alone unit that may functionally couple with other devices or systems as a wireless keyboard, for example in accordance with a Bluetooth™ standard, Zigbee™ standard, or a similar wireless connection. As will be discussed in further detail, below, the control buttons control button system 120 may have one or more functions that may be reassigned or reprogrammed, for example for left handed operation or right handed operation. Furthermore, where notebook 100 comprises a convertible device that allows for operation of notebook in a notebook mode or alternatively in a tablet mode or additional other modes of operation, the functions of the control buttons of control button system 120 may be reassigned or reprogrammed based at least in part on the mode of operation of such a convertible device.

Referring now to FIG. 1B, a top view diagram of the notebook of FIG. 1A showing the operation of the control buttons with a user's thumb in accordance with one or more embodiments will be discussed. In FIG. 1B, the user's hand 136 is shown in a position to operate control button system 120 with the user's thumb. Since control button system 120 is disposed on front edge 124 of keyboard unit 112, the user is able to press and release the individual buttons such as control button 126, control button 128 and/or control button 130 via a movement of the thumb 138 toward or away from the front edge 124 of keyboard unit 112. In other words, the user may operate the control buttons by moving the thumb 138, for example by squeezing the thumb in a non-limited example, on a desired control button in a direction perpendicular to the front edge 124 of keyboard unit 112. In such an arrangement, when the user's thumb 138 is positioned to operate control button system 120, the user's fingers 140 may likewise may be positioned to simultaneously operate track pad 118. Furthermore, although FIG. 1B shows a user's right hand 136, the user's left hand likewise may be positioned to allow similar operation of control button system 120 using the user's left hand thumb and track pad 118 using the user's left hand fingers, and the scope of the claimed subject matter is not limited in this respect. Either right hand or left hand operation of control button system 120 may be implemented by assigning, a desired mouse or other control function to a selected control button according to the user's preference, and the scope of the claimed subject matter is not limited in this respect. Examples of notebook 100 as convertible devices utilizing control button system 120 is shown in and described with respect to the figures that follow, below.

Figure 2:
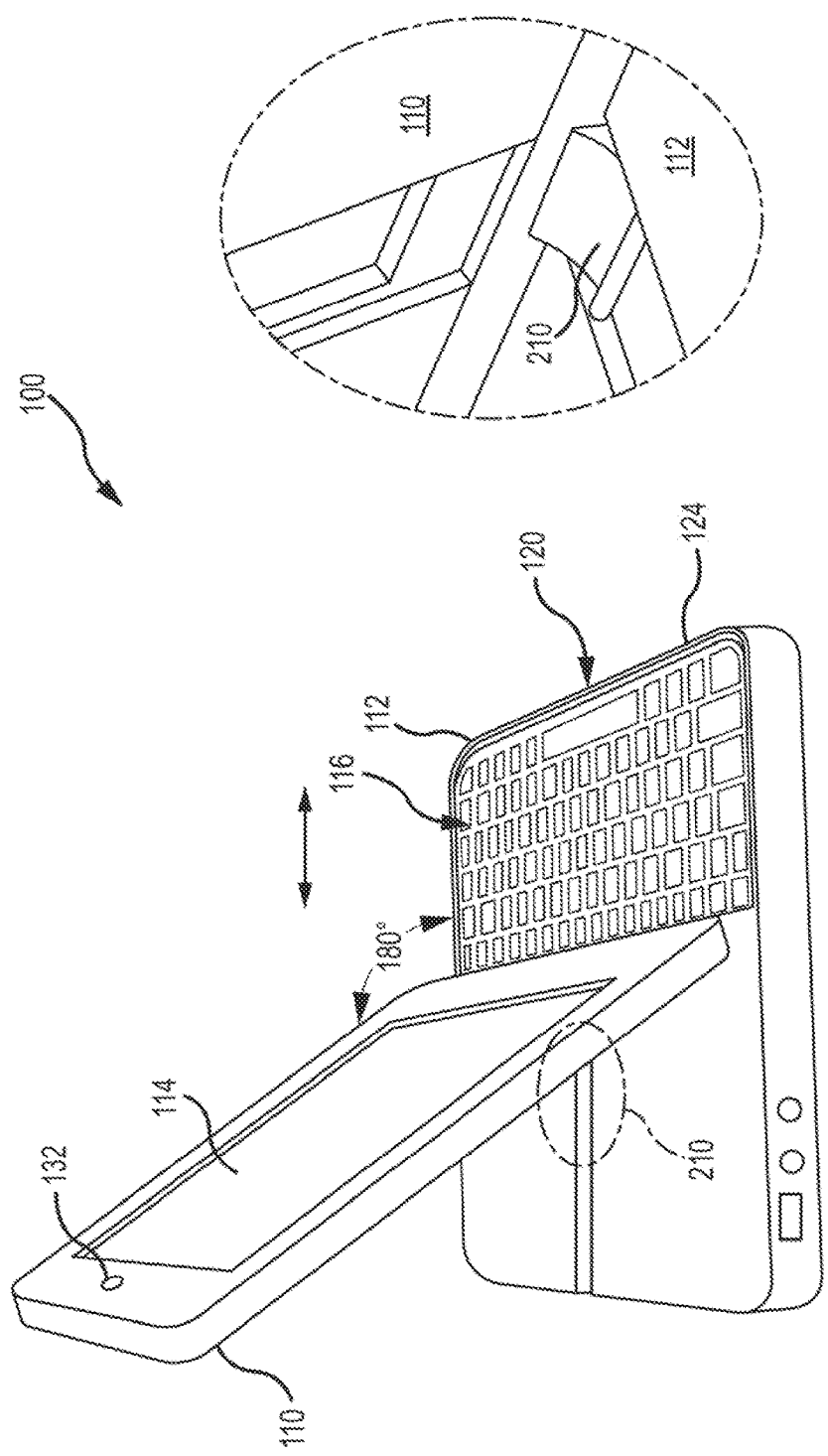
FIG. 2 is a diagram of one convertible notebook having control buttons in accordance with one or more embodiments.
Figure 5:
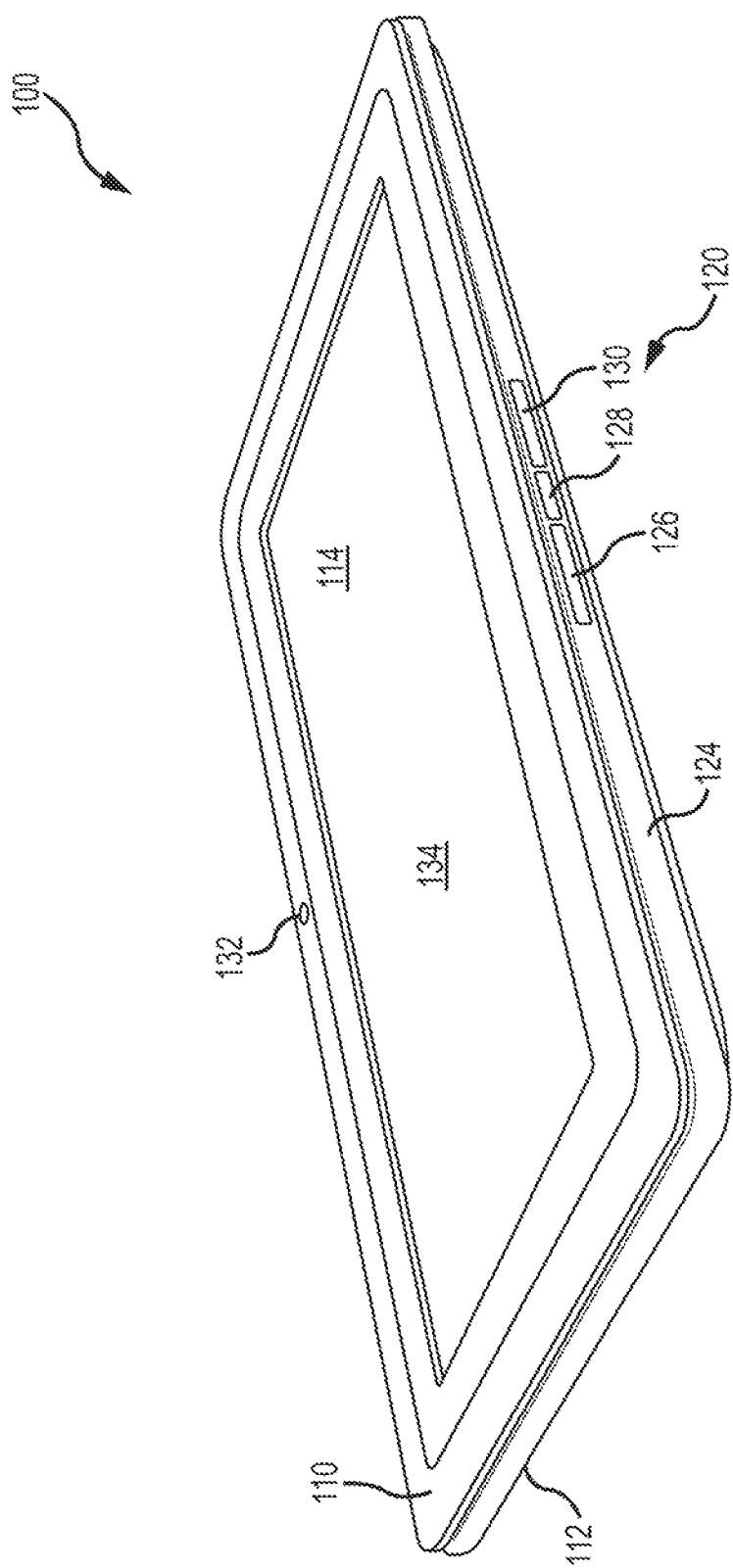
FIG. 5 is a diagram of a convertible device in a tablet mode in accordance with one or more embodiments.

Referring now to FIG. 2, a diagram of one convertible notebook having control buttons in accordance with one or more embodiments will be discussed. In general, a convertible notebook may be referred to as a convertible device. In the embodiment of notebook 100 shown in FIG. 2, one type convertible device is shown. As such, display unit 110 of notebook 100 may be slidable with respect to keyboard unit 112 to move display unit 110 down over keyboard unit 112, thereby converting notebook 110 from a notebook mode such as shown in FIG. 1A to a table mode such as shown in FIG. 5, below, so that display unit 110 and keyboard unit 112 face the same direction with keyboard 116 keyboard unit 112 is hidden below display unit 110. In such an arrangement, hinge 210 may include or be coupled with a switch or other sensor, in general referred to as a position sensor, to detect when display unit 110 is positioned in a notebook mode or in a tablet mode. By detecting operation of notebook 100 in a notebook mode or a tablet mode, the functions of control button system may be assigned or reassigned based at least in part on the detected mode of operation which will be discussed in further detail with respect to FIG. 6 and FIG. 7, below. Another convertible notebook type is shown in and described with respect to FIG. 3 below.

Figure 3:
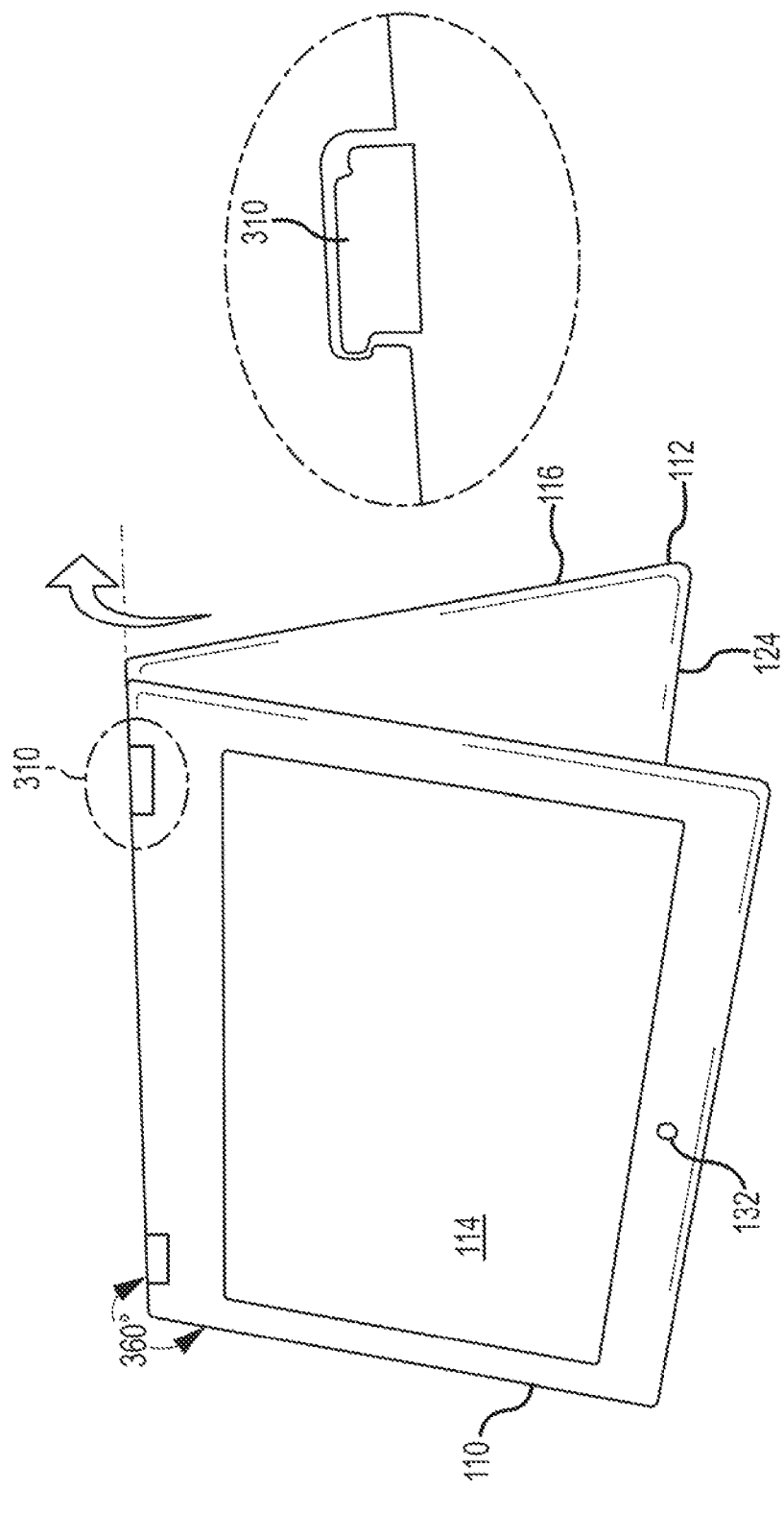
FIG. 3 is a diagram of another convertible notebook having control buttons in accordance with one or more embodiments.

Referring now to FIG. 3, a diagram of another convertible notebook having control buttons in accordance with one or more embodiments will be discussed. In the convertible device shown in FIG. 3, notebook 100 may be convened from a notebook mode to a tablet mode by rotating the display unit 110 away from keyboard 116 of keyboard unit 112 until display 114 of display unit 110 and keyboard 116 of keyboard unit 112 are disposed on opposite sides of notebook 100. Similar to the hinge 210 of FIG. 2, hinge 310 of FIG. 3 may include or be coupled with a switch or sensor, in general referred to as a position sensor, to determine when notebook 100 is in a notebook mode or in a tablet mode, and the functions of control button system may be assigned or reassigned based at least in part on the detected mode of operation.

Figure 4:
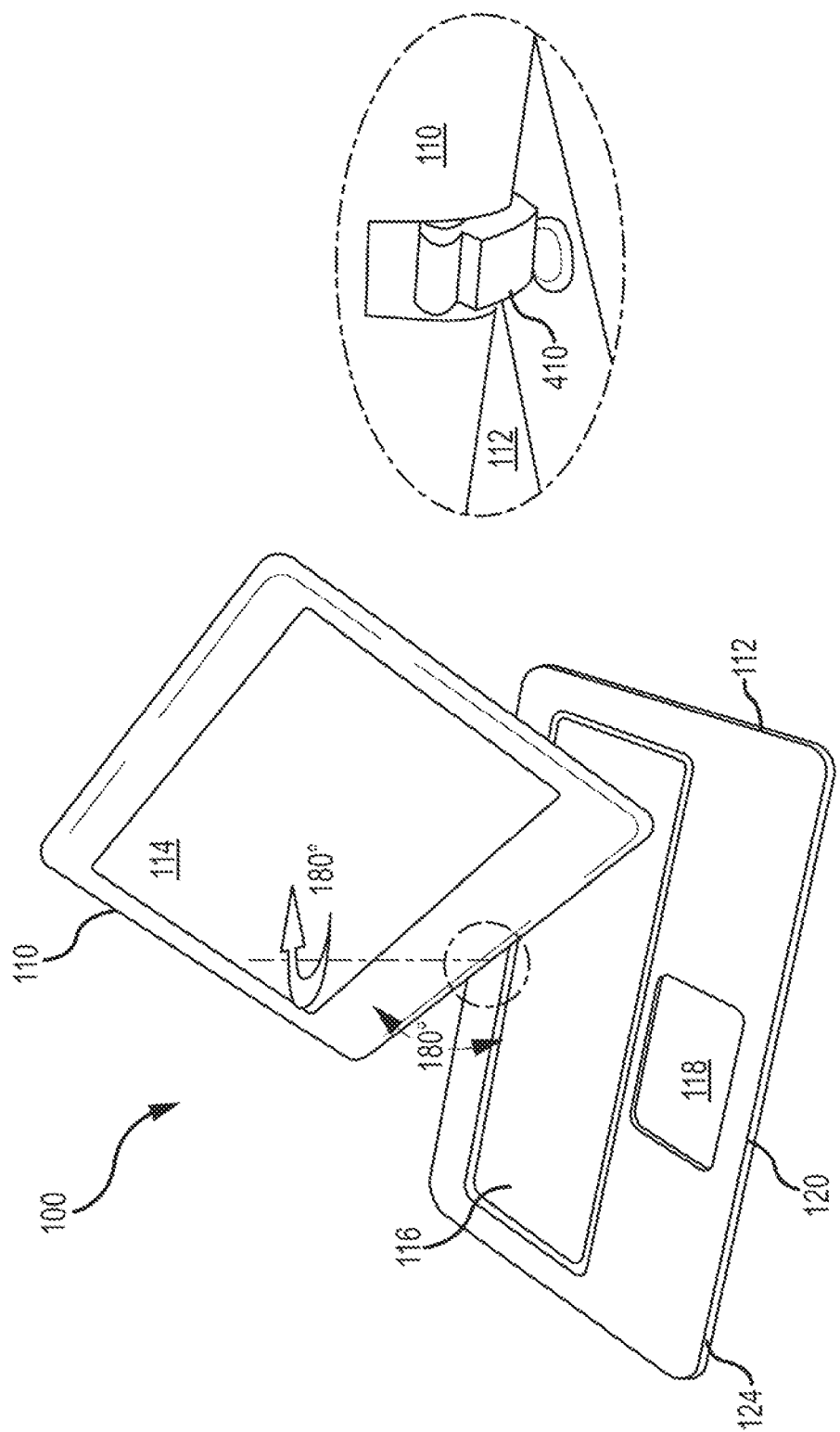
FIG. 4 is a diagram of yet another convertible notebook having control buttons in accordance with one or more embodiments.

Referring now to FIG. 4, a diagram of yet another convertible notebook having control buttons in accordance with one or more embodiments will be discussed. In the convertible device configuration as shown in FIG. 4, notebook 100 may be converted from a notebook mode to a tablet mode by rotation of display unit 110 about an axis, which then may allow display unit to be folded down over keyboard 116 of keyboard unit until display unit 110 covers keyboard 116. Similar to hinge 210 of FIG. 2 and hinge 310 of FIG. 3, hinge 410 of FIG. 4 may include or be coupled with a switch or sensor, in general referred to as a position sensor, to determine when notebook 100 is in a notebook mode or in a tablet mode, and the functions of control button system may be assigned or reassigned based at least in part on the detected mode of operation. An example tablet mode suitable of any of the convertible devices of FIG. 2, FIG. 3 or FIG. 4 is shown in and described with respect to FIG. 5, below.

Referring now to FIG. 5, a diagram of a convertible device in a tablet mode in accordance with one or more embodiments will be discussed. FIG. 5 shows notebook 100 in a tablet mode of operation. Since the control button system 120 is disposed on front edge 124 of keyboard unit 112, the control buttons such as control button 126, control button 128 and/or control button 130, are exposed and accessible even though display unit. 110 is in a position covering top surface of keyboard unit 112. In tablet mode, a user may operate notebook 100 via touch screen 134 (or digitizer) instead of using keyboard 116 or touch pad 118 since display unit 110 may cover keyboard 116 and touchpad 118 in a tablet mode, or since keyboard 116 or touch pad 118 otherwise may be disabled for example for the convertible device system of FIG. 2. In any event, since the user may primarily operate notebook 100 using touch screen 134 (or digitizer) using touch input control instead of mouse input control, the control buttons of control button system 120 do not need to provide mouse button controls when notebook 100 is operating in a tablet mode. The functions of the control buttons of control button system 120 may be reassigned or reprogrammed to provide functions more suitable for a tablet mode of operation, for example volume controls, media playback controls such as play, stop, pause, fast forward or fast backward, mute, screen lock, and so on. Thus, when the position sensor detects that notebook 100 is m a notebook mode, control button system 120 can be assigned to provide mouse type functions, and when the position sensor detects that notebook 100 is an a table mode, control button system 120 can be assigned to provide tablet type functions.

Figure 6:
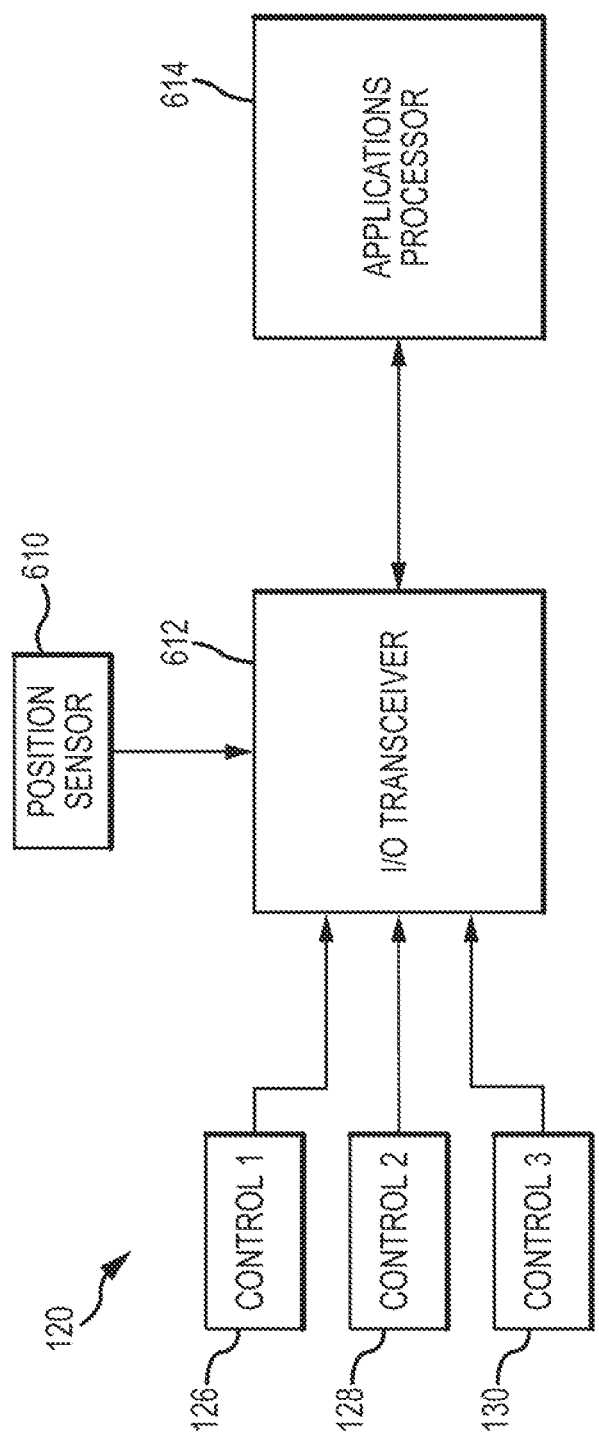
FIG. 6 is a block diagram of a control button system capable of reassigning a function of one or more embodiments.

Referring now to FIG. 6, a block diagram of a control button system capable of reassigning a function of one or more embodiments will be discussed. As shown in FIG. 6, the control buttons of control button system 120 including control button 126, control button 128 and control button 130 are shown being coupled to an input/output (I/O) transceiver 612 which may comprise a standard mouse transceiver or similar device. A position sensor 610 provides an input into I/O transceiver 612 to detect a position of display unit 110 to indicate whether notebook 100 is in a notebook mode of operation or in a tablet mode of operation. Position sensor 610 may comprise a switch or similar sensor disposed in or coupled with hinge 210 of FIG. 2, hinge 310 of FIG. 3 or hinge 410 of FIG. 4 to detect a position of display unit 110 with respect keyboard unit 112 to determine if notebook 100 is in a tablet mode or notebook mode based on the detected position of display unit 110 as discussed herein. For example, position sensor 610 may comprise a variable resistor, potentiometer, rheostat, or similar device, which is able to indicate an angle of rotation of display unit 110 with respect to keyboard unit 112. Position sensor 610 likewise in other examples may comprise an optical device or sensor that is able to optically detect the position of display unit 110 with respect to keyboard unit 112. The signals of control button system 120 and position sensor 610 are provided by I/O transceiver 612 to applications processor 614 of notebook 100. Software or code executed by applications processor 614 assigns the functions of control button system 120 according to the signal provided by position sensor 610. If position sensor 610 detects that notebook 100 is in a notebook mode of operation and provides such a signal to applications processor 614, applications processor 614 may configure control button system 120 to operate in a mouse mode, and interprets signals received from control button system 120 as mouse input signals, however the control buttons may be configured for notebook mode. Likewise, if position sensor 610 detects that notebook 100 is in a tablet mode of operation and provides such a signal to applications processor 614, applications processor 614 may configure control button system 120 to operate in a tablet mode, and interprets signals received from control button system 120 as tablet input signals, however the control buttons may be configured for tablet mode. As notebook 100 is switched back and forth between a notebook mode and a tablet mode, the functions of control button may be reassigned according to the mode of operation detected by position sensor 610. Such a method to reassign the functions of the control buttons is shown in and described with respect to FIG. 7, below.

Figure 7:
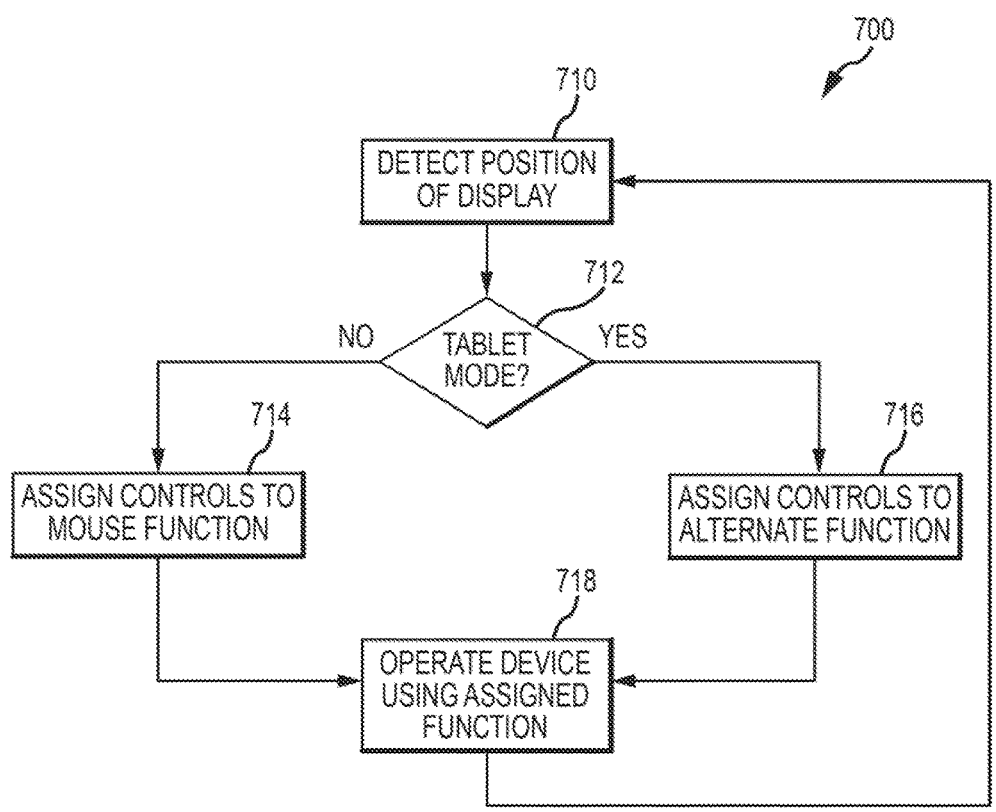
FIG. 7 is a flow diagram of a method to reassign a function of one or more control buttons in accordance with one or more embodiments.

Referring now to FIG. 7, a flow diagram of a method to reassign a function of one or more control buttons in accordance with one or more embodiments will be discussed. It should be noted that method 700 of FIG. 7 may include more or fewer blocks than shown, and/or in various other orders or arrangements of the blocks, and the scope of the claimed subject matter is not limited in these respects. At block 710, a position of display unit 110 may be detected by position sensor 610. A determination may be made at block 712 if the detected position of display unit 110 indicates that notebook 100 is in a tablet mode. If notebook 100 is not in a tablet mode, then mouse function or functions may be assigned at block 714 to one or more control buttons of control button system 120. If notebook 100 is in a tablet mode, then alternate function or functions suitable for a tablet mode may be assigned at block 716 to one or more control buttons of control button system 120. Notebook 110 or the convertible device may be operated at block 718 using the assigned function or functions. Method 700 may the continue at block 710 to detect the position of display unit 100 and assign the appropriate function or functions to the control buttons of control button system 120. In one or more embodiments, method 700 of FIG. 7 may be implemented by the blocks shown in FIG. 6 implemented as an information handling system of notebook 100 or convertible device as shown in and described with respect to FIG. 8, below.

Referring now to FIG. 8, a block diagram of an information handling system of a notebook or convertible device in accordance with one or more embodiments will be discussed. Information handling system 800 of FIG. 8 may tangibly embody the electronic, systems of any one or of notebook 100 as shown in FIG. 1 through FIG. 5, with greater or fewer components depending on the hardware specifications of the particular device. Although information handling system 800 represents one example of several types of computing platforms, information handling system 800 may include more or fewer elements and/or different arrangements of elements than shown in FIG. 8, and the scope of the claimed subject matter is not limited in these respects.

In one or more embodiments, information handling system 800 may include an applications processor 614 and a baseband processor 812. Applications processor 614 may be utilized as a general-purpose processor to run applications and the various subsystems for information handling system 800. Applications processor 614 may include a single core or alternatively may include multiple processing cores wherein one or more of the cores may comprise a digital signal processor or digital signal processing (DSP) core. Furthermore, applications processor 614 may include a graphics processor or coprocessor disposed on the same chip, or alternatively a graphics processor coupled to applications processor 614 may comprise a separate, discrete graphics chip. Applications processor 614 may include on board memory such as cache memory, and further may be coupled to external, memory devices such as synchronous dynamic random access memory (SDRAM) 814 for storing and/or executing, applications during operation, and NAND flash 816 for storing applications and/or data even when information handling system 800 is powered off. In one or more embodiments, instructions to operate or configure the information handling system 800 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 800. Baseband processor 812 may store code for controlling such broadband radio functions in a NOR flash 818. Baseband processor 912 controls a wireless wide area network. (WWAN) transceiver 820 which is used for modulating and/or demodulating broadband network signals, for example for communicating via a 3GPP LTE or LTE-Advanced network or the like.

In general, WWAN transceiver 820 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD) Universal Mobile Telecommunications System (Third Generation) (UMTS (3G)), Wideband Code Division Multiple Access (Universal Mobile Telecommunications System) (W-CDMA (UNITS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA). Long Term Evolution Advanced (4th Generation) (LTE Advanced (4G)), cdmaOne (2G). Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)). Push-to-talk (PTT), Mobile Telephone System (MTS), Improved Mobile Telephone System (IMTS), Advanced Mobile Telephone System (AMTS). OLT (Norwegian for Offentlig Landmobil Telefoni, Public Land Mobile Telephony), MTD (Swedish abbreviation for Mobiltelefonisystem D, or Mobile telephony system D), Public Automated Land Mobile (AutoteLPALM), ARP (Finnish for Autoradiopuhelin, "car radio phone"), NMT (Nordic. Mobile Telephony), High capacity version of NTT (Nippon Telegraph and Telephone) (Hicap), Cellular Digital Packet Data (CDPD), Mobitex, DataTAC, integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFT sensitive circuit. It should be noted that such standards may evolve over time, and/or new standards may be promulgated, and the scope of the claimed subject matter is not limited in this respect.

The WWAN transceiver 820 couples to one or more power amps 822 respectively coupled to one or more antennas 824 for sending, and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi. Bluetooth®, and/or an amplitude modulation (AM) or frequency modulation (FM) radio standard including an IEEE 802.11 a/b/g/n standard or the like, it should be noted that these are merely example implementations for applications processor 614 and baseband processor 612, and the scope of the claimed subject matter is not limited in these respects. For example, any one or more of SDRAM 814, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, applications processor 614 may drive a display 830 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 836 may be utilized to capture images that are processed by applications processor 614 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller, Audio CODEC 844 may be coupled to one or more audio ports 850 to provide microphone input and speaker outputs either via internal devices and/or via external devices coupled to information handling system via the audio ports 850, for example via a headphone and microphone jack. In addition, applications processor 614 may couple to one or more input/output (I/O) transceivers 612 to couple to one or more 110 ports 854 such as a universal serial bus (USB) port, a high-definition multimedia interface (HDMI) port, a serial port, and so on. Furthermore, one or more of the I/O transceivers 612 may couple to one or more memory slots 856 for optional removable memory such as secure digital (SD) card or a subscriber identity module (SIM) card, although the scope of the claimed subject matter is not limited in these respects.

In one or more embodiments, several examples of implementation may be as described as follows. In a first set of examples, a keyboard comprises a housing comprising an upper surface and a lower surface, and a front edge disposed between the upper surface and the lower surface, an array of keys disposed on the upper surface, a track pad disposed on the upper surface between the front edge and the keyboard, and one or more control buttons disposed on the front edge proximate to the track pad. The control buttons may be configurable to provide a first functionality. A user may be able to depress the one or more control buttons by moving a thumb toward a finger of the user when the finger is touching the touch pad. A user may able to depress the one or more control buttons by moving a thumb in a direction generally perpendicular to the front edge. The keyboard may be able to couple with a display unit to provide a notebook form factor. The keyboard may be able to couple with a display unit to provide a tablet form factor, and wherein the one or more control buttons are accessible in the tablet form factor. The keyboard may be able to couple with a display unit to provide either a notebook form factor or a tablet form factor, and wherein the one or more control buttons are configurable to provide a first functionality for the notebook form factor, and to provide a second functionality for the tablet form factor.

In a second set of examples, a notebook comprises a display unit and a keyboard unit to couple with the display unit in a clamshell form factor, wherein the keyboard unit comprises a housing comprising an upper surface and a lower surface and a front edge disposed between the upper surface and the lower surface, an array of keys disposed on the upper surface, a track pad disposed on the upper surface between the front edge and the keyboard, and one or more control buttons disposed on the front edge proximate to the track pad. The control buttons may be configurable to provide a first functionality. A user may be able to depress the one or more control buttons by moving a thumb toward a finger of the user when the finger is touching the touch pad. A user may be able to depress the one or more control buttons by moving a thumb in a direction generally perpendicular to the front edge. The keyboard may be detachable from the display unit.

In a third set of examples, a convertible device comprises a display unit and a keyboard unit to couple with the display unit, wherein the convertible device is capable of operating in a notebook mode when the display unit is in a first position with respect to the keyboard unit, and capable of operating in a tablet mode when the display unit is in a second position with respect to the keyboard unit, wherein the keyboard unit comprises a housing comprising an upper surface and a lower surface and a front edge disposed between the upper surface and the lower surface, an array of keys disposed on the upper surface, and one or more control buttons disposed on the front edge. A user may be able to depress the one or more control buttons by moving a thumb toward a finger of the user when the finger is touching the upper surface of the keyboard unit A user may be able to depress the one or more control buttons by moving a thumb in a direction generally perpendicular to the front edge. The convertible device further may comprise a track pad disposed between the array of keys and the front edge. The keyboard unit may be detachable from the display unit. The one or more control buttons may be accessible when the convertible device is in the tablet mode. The one or more control buttons may be configurable to provide a first functionality when the convertible device is in the notebook mode, and to provide a second functionality when the convertible device is in the tablet mode.

In a fourth set of examples, a control button system to assign a function to one or more control buttons of a convertible device comprises a position sensor to detect a position of a first housing of the convertible device with respect to a second housing of the convertible device, one or more control buttons disposed on the second housing, and a circuit to assign a first function to the one or more control buttons if the position sensor detects that the first housing is in a first position with respect to the second housing, and to assign a second function to the one or more control buttons if the position sensor detects that the first housing is in a second position with respect to the second housing. The first function may comprise a mouse button function. The second function may comprise a tablet button function. The circuit may comprise a processor of the convertible device.

In a fifth set of examples, a method to assign a function to one or more control buttons of a convertible device comprises detecting as position of as display unit of the convertible device with respect to a keyboard unit of the convertible device, assigning a first function to the one or more control buttons if the detected position indicates a notebook form factor of the convertible device, and assigning an alternate function to the one or more control buttons if the detected position indicates a tablet form factor of the convertible device. The alternate functions may include volume control, display brightness control, display lock control, display rotation control, or power control. The method further may comprise reassigning the function of the one or more control buttons if the detected position changes.

In a sixth set of examples, machine-readable storage includes machine-readable instructions that if executed result in detecting a position of a display unit of the convertible device with respect to a keyboard unit of the convertible device, assigning a first function to the one or more control buttons if the detected position indicates a notebook form factor of the convertible device, and assigning an alternate function to the one or more control buttons if the detected position indicates a tablet form factor of the convertible device. The alternate functions may include volume control, display brightness control, display lock control, display rotation control, or power control. The instructions, if executed, further may result in reassigning the function of the one or more control buttons if the detected position changes.

In a seventh example, a convertible device comprises means for detecting a position of a display unit of the convertible device with respect to a keyboard unit of the convertible device, means for assigning a first function to the one or more control buttons if the detected position indicates a notebook form factor of the convertible device, and means for assigning an alternate function to the one or more control buttons if the detected position indicates a tablet form factor of the convertible device. The alternate functions may include volume control, display brightness control, display lock control, display rotation control, or power control. The convertible device further may comprise means for reassigning the function of the one or more control buttons if the detected position changes.

Although the claimed subject matter has been described with a certain degree of particularity, it should be recognized that elements thereof may be altered by persons skilled in the art without departing from the spirit and/or scope of claimed subject matter. It is believed that the subject matter pertaining control buttons for notebooks and convertible devices and/or many of its attendant utilities will be understood by the forgoing, description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A keyboard, comprising:
a housing comprising an upper surface and a lower surface, and a front edge disposed between the upper surface and the lower surface;
an array of keys disposed on the upper surface, wherein the keys are depressible in an angle of depression perpendicular to the upper surface;
a track pad disposed on the upper surface between the front edge and the keyboard; and
one or more control buttons disposed on the front edge proximate to the track pad, wherein the control buttons are depressible in a direction generally at a right angle with respect to the angle of depression of the keys;
wherein the keyboard is able to couple with a display unit to provide either a notebook form factor or a tablet form factor, and wherein the one or more control buttons provide mouse button functionality for the notebook form factor, and provide tablet control functionality comprising volume control, display brightness control, display lock control, display rotation control, or power control functionality for the tablet form factor; and
a position sensor to detect the display unit positioned in the notebook form factor or the tablet form factor, wherein the control keys are assigned mouse button functionality in response to the notebook form factor detected by the position sensor, and the control keys are assigned tablet control functionality in response to the tablet form factor detected by the position sensor.

2. A keyboard as claimed in claim 1, wherein a user is able to depress the one or more control buttons by moving a thumb toward a finger of the user when the finger is touching the touch pad.

3. A keyboard as claimed in claim 1, wherein a user is able to depress the one or more control buttons by moving a thumb in a direction generally perpendicular to the front edge.

4. A keyboard as claimed in claim 1, wherein the keyboard is able to couple with a display unit to provide a notebook form factor.

5. A keyboard as claimed in claim 1, wherein the keyboard is able to couple with a display unit to provide a tablet form factor, and wherein the one or more control buttons are accessible in the tablet form factor.

6. A notebook, comprising:
a display unit; and
a keyboard unit to couple with the display unit in a clamshell form factor, wherein the keyboard unit comprises:
a housing comprising an upper surface and a lower surface, and a front edge disposed between the upper surface and the lower surface;
an array of keys disposed on the upper surface, wherein the keys are depressible in an angle of depression perpendicular to the upper surface;
a track pad disposed on the upper surface between the front edge and the keyboard; and
one or more control buttons disposed on the front edge proximate to the track pad, wherein the control buttons are depressible in a direction generally at a right angle with respect to the angle of depression of the keys;
wherein the keyboard unit is able to couple with the display unit to provide either a notebook form factor or a tablet form factor, and wherein the one or more control buttons provide mouse button functionality for the notebook form factor, and provide tablet control functionality comprising volume control, display brightness control, display lock control, display rotation control, or power control functionality for the tablet form factor; and
a position sensor to detect the display unit positioned in the notebook form factor or the tablet form factor, wherein the control keys are assigned mouse button functionality in response to the notebook form factor detected by the position sensor, and the control keys are assigned tablet control functionality in response to the tablet form factor is detected by the position sensor.

7. A notebook as claimed in claim 6, wherein a user is able to depress the one or more control buttons by moving a thumb toward a finger of the user when the finger is touching the touch pad.

8. A notebook as claimed in claim 6, wherein a user is able to depress the one or more control buttons by moving a thumb in a direction generally perpendicular to the front edge.

9. A notebook as claimed in claim 6, wherein the keyboard is detachable from the display unit.

10. A convertible device, comprising:
a display unit; and
a keyboard unit to couple with the display unit;
wherein the convertible device operates in a notebook mode when the display unit is in a first position with respect to the keyboard unit, and operates in a tablet mode when the display unit is in a second position with respect to the keyboard unit;
wherein the keyboard unit comprises:
a housing comprising an upper surface and a lower surface, and a front edge disposed between the upper surface and the lower surface;
a track pad disposed on the upper surface between the front edge and the keyboard;
an array of keys disposed on the upper surface, wherein the keys are depressible in an angle of depression perpendicular to the upper surface; and
one or more control buttons disposed on the front edge proximate to the track pad, wherein the control buttons are depressible in a direction generally at a right angle with respect to the angle of depression of the keys;
wherein the one or more control buttons provide mouse button functionality when the convertible device is in the notebook mode, and provide tablet control functionality comprising volume control, display brightness control, display lock control, display rotation control, or power control functionality when the convertible device is in the tablet mode; and
further comprising a position sensor to detect the display unit positioned in the notebook form factor or the tablet form factor, wherein the control keys are assigned mouse button functionality in response to the notebook form factor detected by the position sensor, and the control keys are assigned tablet control functionality in response to the tablet form factor detected by the position sensor.

11. A convertible device as claimed in claim 10, wherein a user is able to depress the one or more control buttons by moving a thumb toward a finger of the user when the finger is touching the upper surface of the keyboard unit.

12. A convertible device as claimed in claim 10, wherein a user is able to depress the one or more control buttons by moving a thumb in a direction generally perpendicular to the front edge.

13. A convertible device as claimed in claim 10, further comprising a track pad disposed between the array of keys and the front edge.

14. A convertible device as claimed in claim 10, wherein the keyboard unit is detachable from the display unit.

15. A convertible device as claimed in claim 10, wherein the one or more control buttons are accessible when the convertible device is in the tablet mode.

\* \* \* \* \*